United States Patent [19]

Kazmierczak et al.

[11] Patent Number: 4,477,288
[45] Date of Patent: Oct. 16, 1984

[54] METHOD AND COMPOSITIONS FOR REMOVAL OF UNDESIRABLE ORGANIC MATTER

[75] Inventors: Thomas F. Kazmierczak, Oradell; Richard Dulina, Edison; Arthur W. Petersen, Chatham Township, Union County, all of N.J.

[73] Assignee: American Cyanamid Company, Stamford, Conn.

[21] Appl. No.: 555,808

[22] Filed: Nov. 28, 1983

[51] Int. Cl.$^3$ ............................ B08B 3/08; C09D 9/00
[52] U.S. Cl. ......................................... 134/19; 134/38; 134/40; 252/165; 252/171; 252/542; 252/DIG. 8
[58] Field of Search ................... 134/19, 22.19, 38, 40; 252/524, 542, 165, 166, 171, DIG. 8, 364

[56] References Cited

U.S. PATENT DOCUMENTS

| | | | |
|---|---|---|---|
| 3,031,408 | 4/1962 | Perlman et al. | 134/22.19 X |
| 3,663,447 | 5/1972 | Murphy | 134/38 X |
| 3,819,529 | 6/1974 | Murphy | 252/364 X |
| 3,832,235 | 8/1974 | Cooper et al. | 252/171 X |
| 4,370,174 | 1/1983 | Braithwaite | 252/165 X |

Primary Examiner—Marc L. Caroff
Attorney, Agent, or Firm—Charles J. Fickey

[57] ABSTRACT

Method for removing undesirable organic matter from a surface which comprises applying to the undesirable organic matter an amount of (1) imidazole, pyrazole or an alkyl or aryl substituted imidazole or pyrazole, and (2) a phenyl glycol ether for a time sufficient to loosen the organic matter from the surface, and removing the loosened organic matter from the surface. Compositions containing the imidazole, pyrazole, substituted imidazole or substituted pyrazole and phenyl glycol ethers as the active ingredients are also within the scope of the invention.

21 Claims, No Drawings

METHOD AND COMPOSITIONS FOR REMOVAL OF UNDESIRABLE ORGANIC MATTER

The removal of undesirable organic matter from various hard surfaces such as metal, ceramics, baked enamel, has received a great deal of study. The organic matter referred to herein occurs for example, as soil in ovens, on baking pans and barbecue racks, as finishes, coatings, paints and the like.

Oven soil which contains baked-on fat and other food ingredients is usually cleaned by applying to the soil thickened solutions of one of the caustic metal alkalis, either sodium or potassium hydroxide. These materials react with and hydrolyze the fats, converting them at least partially into their sodium or potassium salts, which are water soluble. These water soluble soaps are then washed out of the oven with a wet rag or sponge. Commercial products of this type usually contain up to 5% of the metal hydroxide together with other components such as solvents, wetting agents, etc., which contribute to the efficacy of the product.

Products of the type described, although efficient in their cleaning ability, suffer a number of major disadvantages. They are corrosive and, hence, are severely hazardous to the eyes and skin. Also, the residue after cleaning is slimy due to the saponification reaction and unreacted cleaner, making the task of removing the residue both messy and burdensome.

Non-caustic compositions for removal of oven soil are described in U.S. Pat. Nos. 4,236,935; 4,193,886; 4,116,848; and 3,808,051. However, all appear to describe a saponification reaction with the formation of water soluble or dispersible soaps. The residue from the reaction would be washed out with a wet or damp sponge. Heating the composition on the soil to a temperature of at least 250° F. is also necessary for cleaning to occur.

U.S. Pat. No. 3,881,948 also describes a non-caustic composition, based on a polyhydric alcohol and an alkaline acting catalyst. Here the reaction also forms water soluble or water dispersible compounds which must be washed out of the oven. Heating the composition on the soil to a temperature of at least 250° F. is necessary for cleaning to occur.

For the removal of finishes, coatings, paints, and the like, aqueous solutions of alkali metal hydroxides have been used to saponify the fatty acid constituents of the bonding component of the composition, thereby loosening and facilitating the removal thereof. Such products have similar disadvantages to the oven cleaner compositions based on alkali metal hydroxides in that they are corrosive to the eye and skin. These "stripping" compositions generally contain other additives such as water miscible solvents, accelerators, surfactants and thickeners, to aid product performance. For example, U.S. Pat. No. 3,819,529 discloses a paint stripping composition consisting essentially of an inorganic alkaline material selected from the group consisting of alkali metal hydroxides, carbonates, silicates, and phosphates and an alkyl or aryl (having not more than six (6) carbon atoms) substituted imidazole. The substituted imidazole is described as an accelerator. although the disclosure of this patent is confusing as to necessary components which comprise the stripping composition, it is clear that the substituted imidazole is not the stripping agent, but only acts to increase the rate of attack. It is the strong alkali metal compounds which operate to loosen the paint from the surface.

In copending, commonly assigned application Ser. No. 458,229, filed Jan. 17, 1983, is disclosed a novel method of removing organic matter from a surface, which comprises applying to the organic matter imidazole, pyrazole or an alkyl or aryl substituted imidazole or pyrazole, or a composition containing the imidazole or pyrazole, for a sufficient time to loosen the organic matter, and removing the loosened organic matter from the surface.

It is, accordingly, an object of the invention to provide improved compositions for the removal of organic matter from surfaces, containing imidazole, pyrazole or alkyl or aryl substituted imidazole or pyrazole.

It is a further object of the invention to provide novel compositions which are non-caustic, non-corrosive, and essentially non-irritating to the eyes and skin.

It is another object of the invention to provide a novel method and novel compositions which give a relatively dry residue which may be physically removed from the surface by wiping or brushing.

It is yet another object of the inventions to provide such novel compositions which are useful in a variety of forms, such as paste, aerosol, and pump spray.

These and other objects and advantages of the instant invention will become apparent from the following detailed description.

It has now been found that effectiveness of imidazole, pyrazole and their alkyl and aryl derivatives to remove organic matter from a surface may be greatly improved by their use in combination with glycol phenyl ethers. The combination results in a synergistic effect in that the combination cleans better than either the azole or phenyl glycol ether alone. In fact, it has been found that the phenyl glycol ethers have no cleaning power at all below 20 percent in formulations.

Thus, the novel method of the invention comprises applying to the undesirable organic matter an amount of (1) imidazole, pyrazole or an alkyl or aryl substituted imidazole or pyrazole and (2) a phenyl glycol ether for a time sufficient to loosen the organic matter from the surface and removing the loosened organic mater from the surface. Compositions containing the imidazole, pyrazole, substituted imidazole or substituted pyrazole and phenyl glycol ethers as active ingredients are also within the scope of the invention. Obviously, two or more of these azole compounds and phenyl glycol ethers may be used in combination in the method or compositions of the present invention. Compounds falling within the scope of an alkyl or aryl substituted imidazole include, inter alia, 1-methylimidazole, 2-methylimidazole, 4-methylimidazole, 1,2-dimethylimidazole, 2-ethylimidazole, 2-isopropylimidazole, 2-ethyl-4-methylimidazole, 2-phenylimidazole, 4-phenylimidazole, benzimidazole and the like. Compounds falling within the scope of an alkyl or aryl substituted pyrazole include 3-methylpyrazole, 3,5-dimethylpyrazole and the like.

The phenyl glycol ethers are those having from 1 to 6 carbon atoms in the glycol chain. Preferred are ethylene glycol phenyl ether and propylene glycol phenyl ether.

The combination of imidazole, pyrazole, alkyl or aryl substituted imidazole, or alkyl or aryl substituted pyrazole and phenyl glycol ethers is effective by itself, without the need for a carrier, or additional ingredients, such as the alkali metal compounds required in U.S. Pat.

No. 3,819,529, supra, provided only that the compound be in liquid form at use temperature.

Obviously, it is also desirable that the imidazole, pyrazole, substituted imidazole or substituted pyrazole and pheyn glycol ethers be maintained in contact with the soiled substrate to effectuate maximum cleaning. Accordingly, thickened solutions or suspensions of the compound which may be applied as a paste or via pump spray or aerosol systems would be preferred for many applications, such as in oven cleaning, where the compound must be maintained on an overhead and/or vertical surface. Preparation of these aerosol, pump spray and paste compositions are within the ordinary skill in the art.

The amount of imidazole, pyrazole or substituted derivatives in the combination may range from about 1% to 99% by weight, and the phenyl glycol ethers may range from about 1% to 20% by weight.

When used with a carrier (or carrier plus additional ingredients), the concentration of the imidazole, pyrazole, substituted imidazole or substituted pyrazole may vary over a wide range—from as little as about 1%, by weight, to as much as 99%, by weight. Preferably, the imidazole, pyrazole, substituted imidazole or substituted pyrazole will comprise about 2 to 25% by weight of the total composition, and the phenyl glycol ethers comprise about 1 to 4% by weight. Aqueous carriers, or water and water miscible organic solvent mixtures are preferred. The percent of the combined active materials should be at least about 3% and, preferably, 5% by weight. It has been found that the aryl substituted and higher alkyl (chain length greater than two (2) carbons) substituted imidazoles and pyrazoles are not very soluble in water and, accordingly, the use of a cosolvent in a composition containing any of these compounds and water may be desirable. Alternatively, a non-aqueous carrier may be used. When the particular compound used is not liquid at a desired use temperature (such as room temperature), these carriers may be used to solubilize the compound, and, accordingly, the carrier system may be routinely chosen by one skilled in the art taking into consideration the solubility of the particular compound being used in various solvent mixtures, and the intended use. Alternatively, of course, the compound may be applied as a dispersion thereof in a carrier, or in a dry state at, for example, room temperature, and the system heated to a temperature sufficient to cause the compound to be solubilized in the carrier or melt, thereby rendering the same "active".

When a thickening agent is desirably used with the compound, for example when the organic matter to be removed is on a non-horizontal surface, any such agent, or mixture of two or more thereof, which is compatible with the imidazole, pyrazole or substituted imidazole or pyrazole (and with other ingredients in a formulation, if a formulation is used) may be used. Useful organic thickening agents include starch, sodium carboxymethylcellulose, hydroxyethyl cellulose, methocel, and water-soluble polymers such as carboxy vinyl polymer (Carbopols from B. F. Goodrich Chemical Company) and most preferred are Xanthan gums such as Keltrol®, made by Kelco Company. Inorganic colloidal materials, such as Veegum (magnesium aluminum silicates manufactured by R. T. Vanderbilt), are also effective. When used, the thickening agent will typically comprise about 0.1 to 10%, by weight, of the composition, although more or less may be used.

It may also be preferable in certain instances to have present as a component of the composition of the present invention a minor amount of surface active agent which will cause the composition to spread evenly over the surface from which the undesirable organic matter is to be removed, or to form a foam. The surface active agents can be any of those commonly known and used as such. An extensive list of such agents appears in the publication McCutcheon's Detergents & Emulsifiers, 1982 Annual. The agents can be anionic, cationic, nonionic, or amphoteric and should be compatible with the other ingredients and impart the desired surface active properties. When used, the surface active agent will typically comprise about 0.01 to 0.8%, by weight, of the composition, although more or less may be used.

Examples of anionic surfactants include (a) carboxylic acids such as soaps of straight chain naturally occurring fatty acids, chain-substituted derivatives of fatty acids, branched-chain and odd-carbon fatty acids, acids from paraffin oxidation, and carboxylic acids with intermediate linkages; (b) sulfuric esters such as sodium lauryl sulfate, tallow alcohol sulfates and coconut alcohol sulfates; and (c) alkylaryl sulfonates such as sodium dodecylbenzene sulfonate, sodium tridecyl benzene sulfonate, and sodium dodecyl diphenyloxide disulphonate.

Examples of cationic surfactants include (a) nonquaternary nitrogen bases such as amines without intermediate linkages; and (b) quaternary nitrogen bases of the formula:

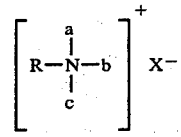

wherein R is a straight-chain alkyl of 12 to 19 carbon atoms, wherein a, b, and c are methyl, ethyl, or benzyl (usually not more then one benzyl group being present) and wherein X is halide such as chloride, bromide or iodide, methylsulfate or ethylsulfate and quaternary ammonium salts such as Hyamine 10X (disiobutylcresoxy ethoxyethyl dimethylbenzyl ammonium choride monohydrate).

Examples of nonionic surfactants include polyethyleneoxy ethers of alkylphenols, alkanols, esters and polyethyleneoxy compounds with amide links.

In one embodiment of the composition of the invention, a water insoluble, finely divided materials is suspended therein to aid in removing the organic matter and residual composition after the organic matter has been loosened from the surface. Although the addition of these materials assist in the removal of varnish, finishes, coatings, paints, and the like, it has been found to be particularly beneficial for the removal of oven soil. In oven cleaning applications, the addition of these materials has been found to contribute to the ease of removal of the organic matter (and residual composition) from the oven surface after the cleaning cycle by wiping with a dry or wet paper towel, a brush or the like. When used, the amount of such finely divided material present in the composition of the present invention typically ranges from about 1 to 25%, by weight, of the composition, preferably about 2 to 10%, although more or less may be used. Examples of such finely divided inorganic material include calcium carbonate, magnesium carbonate, magnesium hydroxide, silica, feldspar, clay and talc.

In another embodiment of the composition of the present invention, a water soluble salt of a strong base and a strong acid is added to the composition containing the imidazole, pyrazole, or substituted imidazole or pyrazole and phenyl glycol ethers. The addition of the salt has been found to improve the soil loosening activity of the composition and also contributes to the ease of removal of the organic matter and residual composition. Here again, the benefit has been found to be particularly pronounced in oven cleaning applications. When used, the amount of the salt typically ranges from about 1% to 25% by weight, of the composition depending, of course, upon the solubility of the compound being used, and is preferably about 1% to 10%, by weight, of the composition, although more or less may be used. Examples of such water soluble salts include sodium chloride, potassium chloride, sodium sulfate, and potassium sulfate.

Other additives which are typically used in compositions for removal of organic matter may also be used in the compositions of the present invention, provided, of course, that they are compatible therewith. Exemplary of such other additives are humectants, antifoaming agents, dispersants and the like.

It is an advantage of the method and compositions of the present invention that the same may be employed at room temperature, or at elevated temperatures when speedier cleaning is desired or necessary, such as in oven cleaning applications.

The present invention is further illustrated by the following examples. However, it is to be understood that the invention is not to be deemed in any way limited by these examples. All parts and percentages are by weight unless indicated to the contrary.

EXAMPLES 1 TO 4

A fifty percent chicken fat, fifty percent lard soil composition was baked on porcelain trays at 500° F. for 30 minutes. The baking converted the chicken fat and lard into a hard, brown, varnish-like coating, similar in composition and appearance to the fatty soil found in ovens. The trays were then cooled and the following compositions were applied to the trays under the conditions indicated.

EXAMPLE 1

Ten percent aqueous solution of imidazole at room temperature, allowed to remain overnight.

EXAMPLE 2

Five percent imidazole/2% ethylene glycol phenyl ether at room temperature, allowed to remain overnight.

EXAMPLE 3

Ten percent aqueous solution of imidazole, heated to 225° F. for 15 minutes.

EXAMPLE 4

Five percent imidazole/2% ethylene glycol phenyl ether aqueous solution, heated to 225° F. for 15 minutes.

In each of Examples 1 to 4 it was observed that the soil wrinkled and broke away from the porcelain surface. The solution solidified with the wrinkled soil, and the residue was readily removed from the porcelain surface.

The effectiveness of the 5% imidazole/2% ethylene glycol phenyl ether was equal to that of the 10% imidazole solution in removing the soil from the porcelain trays.

EXAMPLES 5 TO 19

A formulation was prepared as follows:

| | |
|---|---|
| Active | up to 5% |
| $CaCO_3$ | 3% |
| $K_2SO_4$ | 1.5% |
| Dowfax 2Al | 0.1% |
| Keltrol | 0.5% |
| Water | Balance |

The active material was imidazole or ethylene glycol phenyl ether in the amounts shown in Tables I and II. The formulation was applied to soiled porcelain trays as described in Examples 3 and 4. The cleaning results are shown in Tables I and II.

TABLE I

| Example | Active | % Cleaned |
|---|---|---|
| 5 | 5% Imidazole | 75 |
| 6 | 4% Imidazole | 70 |
| 7 | 3% Imidazole | 15 |
| 8 | 5% EPh | 0 |
| 9 | 4% EPh | 0 |
| 10 | 3% EPh | 0 |

The results shown in Table I illustrate that ethylene glycol phenyl ether alone has no cleaning activity and that imidazole alone has little cleaning activity below 4%.

TABLE II

| Example | Formulation Imidazole % | EPh % | Total Active % Material | Expected % Cleaning | Actual % Cleaning |
|---|---|---|---|---|---|
| 11 | 4 | 1 | 5 | ~70 | 90 |
| 12 | 3 | 2 | 5 | ~15 | 90 |
| 13 | 2 | 3 | 5 | <5 | 90 |
| 14 | 1 | 4 | 5 | <5 | 85 |
| 15 | 3 | 1 | 4 | ~15 | 40 |
| 16 | 2 | 2 | 4 | <5 | 15 |
| 17 | 1 | 3 | 4 | <5 | 10 |
| 18 | 2 | 1 | 3 | <5 | 15 |
| 19 | 1 | 2 | 3 | <5 | 10 |

Examples 11 to 19 illustrate the cleaning combination of the invention. These examples illustrate the synergistic effect of the combination of imidazole with ethylene glycol phenyl ether. In Example 11, the predicted cleaning effectiveness of 4% imidazole was 70%. The addition of 1% ethylene glycol phenyl ether which was demonstrated to have no cleaning effectiveness alone, resulted in a 20% increase in cleaning effectiveness. Similar increases are shown in Examples 12 to 14. Examples 15 to 19 also show a synergistic effect and illustrate that, for practical use, the amount of active material in the combination should be at least about 5%.

EXAMPLES 20 AND 21

The following formulations were prepared with quantities expressed as percent by weight.

| | Example 20 | Example 21 |
|---|---|---|
| Imidazole | 3 | 3 |
| Ethylene Glycol Phenyl Ether | 2 | 2 |

-continued

|  | Example 20 | Example 21 |
|---|---|---|
| Diethylene Glycol N—Butyl Ether | 0 | 3 |
| d-limonene | 3 | 2 |
| Potassium Carbonate | 0.5 | 0.5 |
| Potassium Sulfate | 1.75 | 1.75 |
| Xanthan Gum | 0.4 | 0.4 |
| Calcium Carbonate | 4 | 4 |
| Ethoxylated Alcohol Neodol 91-6 | 0.1 | 0.1 |
| Sorbitol | 2 | 0 |
| Water | 83.25 | 83.25 |
| pH is 11 or below | | |

These formulations were applied under the conditions described in Examples 1 to 4. Over 90% soil removal was obtained in each case.

Use of propylene glycol phenyl ether in place of ethylene glycol phenyl ether resulted in substantially the same cleaning results when used according to Examples 3 and 4.

What is claimed is:

1. A method for facilitating the removal of undesirable organic matter from a surface which comprises contacting said organic matter with a substantially loosening effective amount of a composition comprising (1) at least one compound selected from imidazole, pyrazole, an alkyl or aryl substituted imidazole, an alkyl or aryl substituted pyrazole, and (2) at least one glycol phenyl ether in synergistic proportions, for a time sufficient to effect a substantial loosening of said organic matter.

2. The method according to claim 1 wherein the composition is applied to said organic matter in dry form and heated to at least a temperature at which the composition is rendered liquid.

3. The method according to claim 1 wherein the organic matter-containing surface is first heated to a temperature above the melting point of the composition and the composition is then applied thereto.

4. The method according to claim 1 wherein the composition is applied to said organic matter in a liquid form.

5. The method according to claim 4 wherein the liquid form is a solution.

6. A method according to claim 1 for facilitating the removal of undesirable organic matter from a surface which comprises contacting said organic matter with a substantially loosening effective amount of said composition in dry, dispersion, or part solution-part dispersion form and heating the composition to a temperature at which the composition is rendered liquid for a time sufficient to effect a substantial loosening of said organic matter.

7. The method according to claim 1 wherein the compound is imidazole, 2-methylimidazole, 4-methylimidazole, 1,2-dimethylimidazole, 2-ethylimidazole, 2-ethyl-4-methylimidazole, 2-isopropylimidazole, or a mixture of two or more thereof.

8. The method according to claim 1 wherein the compound is imidazole.

9. The method according to claim 1 wherein said glycol phenyl ether has from 1 to 6 carbon atoms in the glycol carbon chain.

10. The method according to claim 9 wherein said glycol phenyl ether is ethylene glycol phenyl ether or propylene glycol phenyl ether.

11. The method according to claim 6 wherein the organic matter-containing surface is first heated to a temperature above the melting point of the composition, and the composition is then applied to the organic matter.

12. The method according to claim 1 wherein the organic matter is food soil and the surface is an oven surface.

13. The method according to claim 8 wherein the organic matter is food soil and the surface is an oven surface.

14. A non-caustic composition for facilitating the removal of undesirable organic matter from a surface which comprises (a) a substantially loosening effective amount of (i) at least one azole compound selected from imidazole, pyrazole, an alkyl or aryl substituted imidazole, an alkyl or aryl substituted pyrazole, and (ii) at least one glycol phenyl ether in synergistic proportions, and (b) a carrier.

15. The composition according to claim 14 wherein (b) is water or water and one or more organic solvents.

16. The composition of claim 14 further comprising (c) a thickening agent and, optionally, one or more of (d) a surfactant, (e) a finely divided inorganic material, and (f) a water soluble salt of a strong acid and a strong base.

17. The composition of claim 16 wherein (c) is selected from the group consisting of starch, sodium carboxymethyl cellulose, hydroxymethyl cellulose, methocel, carboxy vinyl polymers, Xanthan gum, magnesium aluminum silicates, and mixtures of two or more thereof, (e) is selected from the group consisting of calcium carbonate, magnesium carbonate, magnesium hydroxide, silica, feldspar, clay, talc, and mixtures of two or more thereof, and (f) is selected from the group consisting of sodium chloride, potassium chloride, sodium sulfate, potassium sulfate and mixtures of two or more thereof.

18. The composition according to claim 16 wherein (c) is a Xanthan gum, a magnesium aluminum silicate, or a mixture thereof, (e) is calcium carbonate, and (f) is potassium sulfate.

19. The composition according to claim 14 wherein said azole compound is imidazole, 2-methylimidazole, 4-methylimidazole, 1,2-dimethylimidazole, 2-ethylimidazole, 2-ethyl-4-methylimidazole, 2-isopropylimidazole or a mixture of two or more thereof.

20. The composition according to claim 17 wherein said azole compound is imidazole.

21. The composition of claim 14 wherein said glycol phenyl ether is ethylene glycol phenyl ether or propylene glycol phenyl ether.

* * * * *